US012644442B2

(12) United States Patent
Benistand-Hector et al.

(10) Patent No.: US 12,644,442 B2
(45) Date of Patent: Jun. 2, 2026

(54) INSTALLATION FOR PUMPING CRYOGENIC FLUID AND FILLING STATION COMPRISING SUCH AN INSTALLATION

(71) Applicant: L'Air Liquide, Société Anonyme pour l'Etude et l'Exploitation des Procédés Georges Claude, Paris (FR)

(72) Inventors: Cyril Benistand-Hector, Sassenage (FR); Martin Graser, Metzingen (DE)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 105 days.

(21) Appl. No.: 18/569,876

(22) PCT Filed: May 5, 2022

(86) PCT No.: PCT/EP2022/062105
§ 371 (c)(1),
(2) Date: Dec. 13, 2023

(87) PCT Pub. No.: WO2022/263052
PCT Pub. Date: Dec. 22, 2022

(65) Prior Publication Data

US 2024/0384710 A1 Nov. 21, 2024

(30) Foreign Application Priority Data

Jun. 14, 2021 (FR) ...................................... 2106231

(51) Int. Cl.
*F04B 15/08* (2006.01)
*F04B 9/02* (2006.01)
(Continued)

(52) U.S. Cl.
CPC ................ *F04B 15/08* (2013.01); *F04B 9/02* (2013.01); *F04B 9/04* (2013.01); *F04B 23/021* (2013.01);
(Continued)

(58) Field of Classification Search
CPC .... F04B 15/08; F04B 9/02; F04B 9/04; F04B 23/021; F04B 35/04; F04B 37/08;
(Continued)

(56) References Cited

U.S. PATENT DOCUMENTS 2,018,144 A * 10/1935 Mesinger ................ F04B 15/08 417/415
3,299,828 A * 1/1967 Josephian ............. F04B 53/164 74/18.2
(Continued)

FOREIGN PATENT DOCUMENTS

EP 0 628 723 5/1994

OTHER PUBLICATIONS

International Search Report for corresponding PCT/EP2022/062105, Aug. 4, 2022.

*Primary Examiner* — Charles G Freay
(74) *Attorney, Agent, or Firm* — Elwood L. Haynes

(57) ABSTRACT

An installation for pumping cryogenic fluid including a fluid tight enclosure designed to contain a bath of cryogenic fluid, the enclosure housing a compression chamber configured to compress the fluid in the compression chamber, the piston being mounted at a first end of a rod. The installation including a drive mechanism driving a second end of the rod in a back and forth movement in a longitudinal direction of travel. In the configuration of operation of the installation, the longitudinal direction of travel of the piston rod being vertical, the motor being fixed rigidly to an upper mounting structure. The mechanical conversion system is also fixed
(Continued)

rigidly to an upper mounting structure which comprises the mounting structure for the motor or a separate mounting structure rigidly connected to the mounting structure for the motor.

13 Claims, 10 Drawing Sheets

(51) Int. Cl.

| | |
|---|---|
| ***F04B 9/04*** | (2006.01) |
| ***F04B 23/02*** | (2006.01) |
| ***F04B 37/08*** | (2006.01) |
| ***F04B 39/06*** | (2006.01) |
| ***F04B 53/00*** | (2006.01) |
| ***F04B 53/08*** | (2006.01) |
| ***F04B 53/22*** | (2006.01) |
| *F04B 35/04* | (2006.01) |

(52) U.S. Cl.
CPC ............ *F04B 37/08* (2013.01); *F04B 39/064* (2013.01); *F04B 53/00* (2013.01); *F04B 53/08* (2013.01); *F04B 53/22* (2013.01); *F04B 35/04* (2013.01); *F17C 2223/0161* (2013.01)

(58) Field of Classification Search
CPC ........ F04B 39/064; F04B 53/00; F04B 53/08; F04B 53/22; F17C 2223/0161
USPC ............................................ 417/901; 62/50.6
See application file for complete search history.

(56) References Cited

U.S. PATENT DOCUMENTS

| | | | | | |
|---|---|---|---|---|---|
| 4,198,373 | A * | 4/1980 | Kropp | B01F 35/4111 | 422/135 |
| 4,447,195 | A * | 5/1984 | Schuck | F01B 9/02 | 417/570 |
| 5,545,015 | A | 8/1996 | Sherrer | | |
| 5,593,288 | A * | 1/1997 | Kikutani | F04B 53/06 | 417/466 |
| 2011/0232283 | A1 * | 9/2011 | Gregory | E21B 43/126 | 60/641.8 |
| 2014/0157796 | A1 * | 6/2014 | Drube | F17C 7/02 | 62/50.1 |
| 2016/0281690 | A1 | 9/2016 | Coldren et al. | | |
| 2018/0180035 | A1 | 6/2018 | Popadiuc | | |

* cited by examiner

[FIG.1]
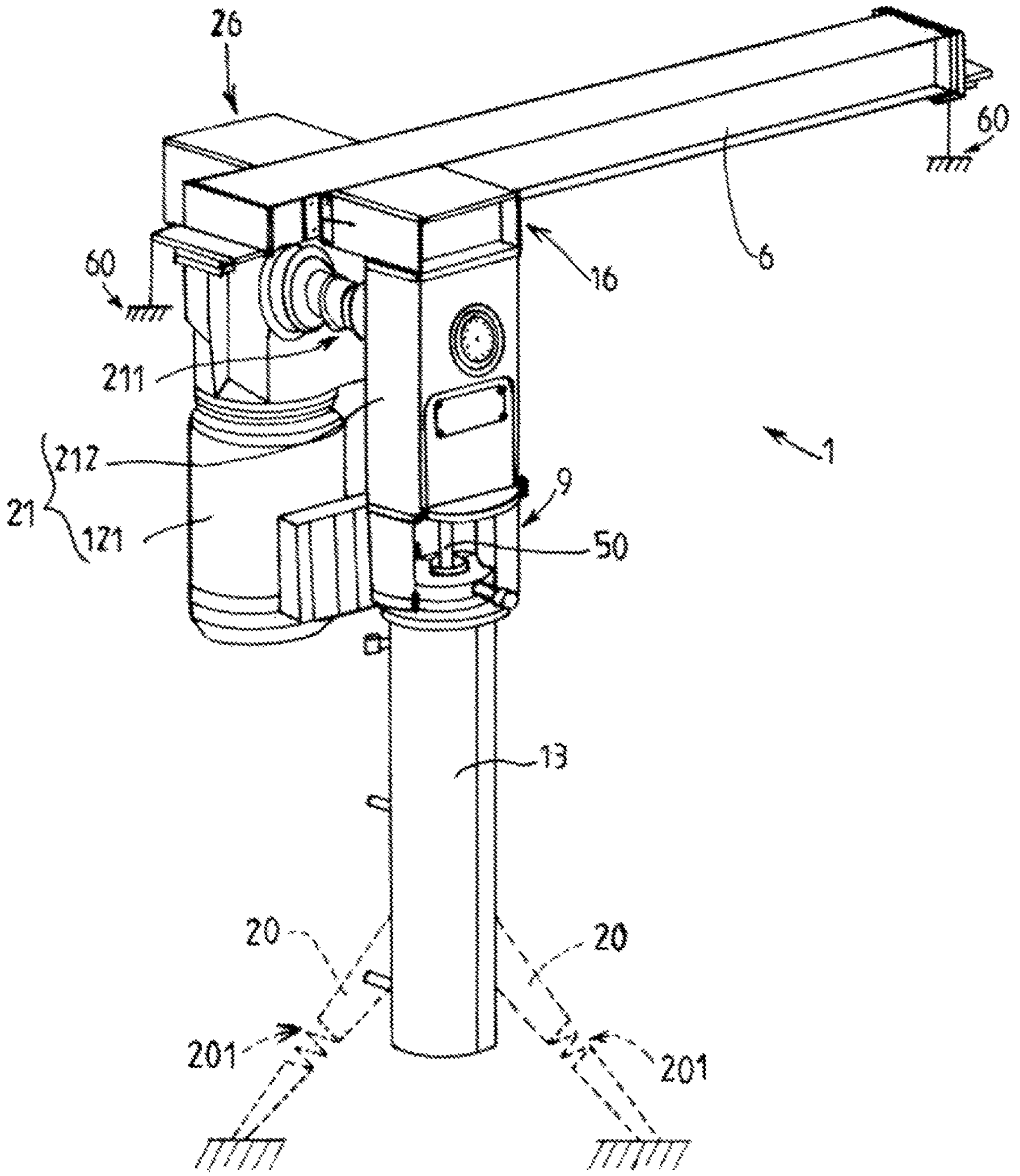

[FIG.2]
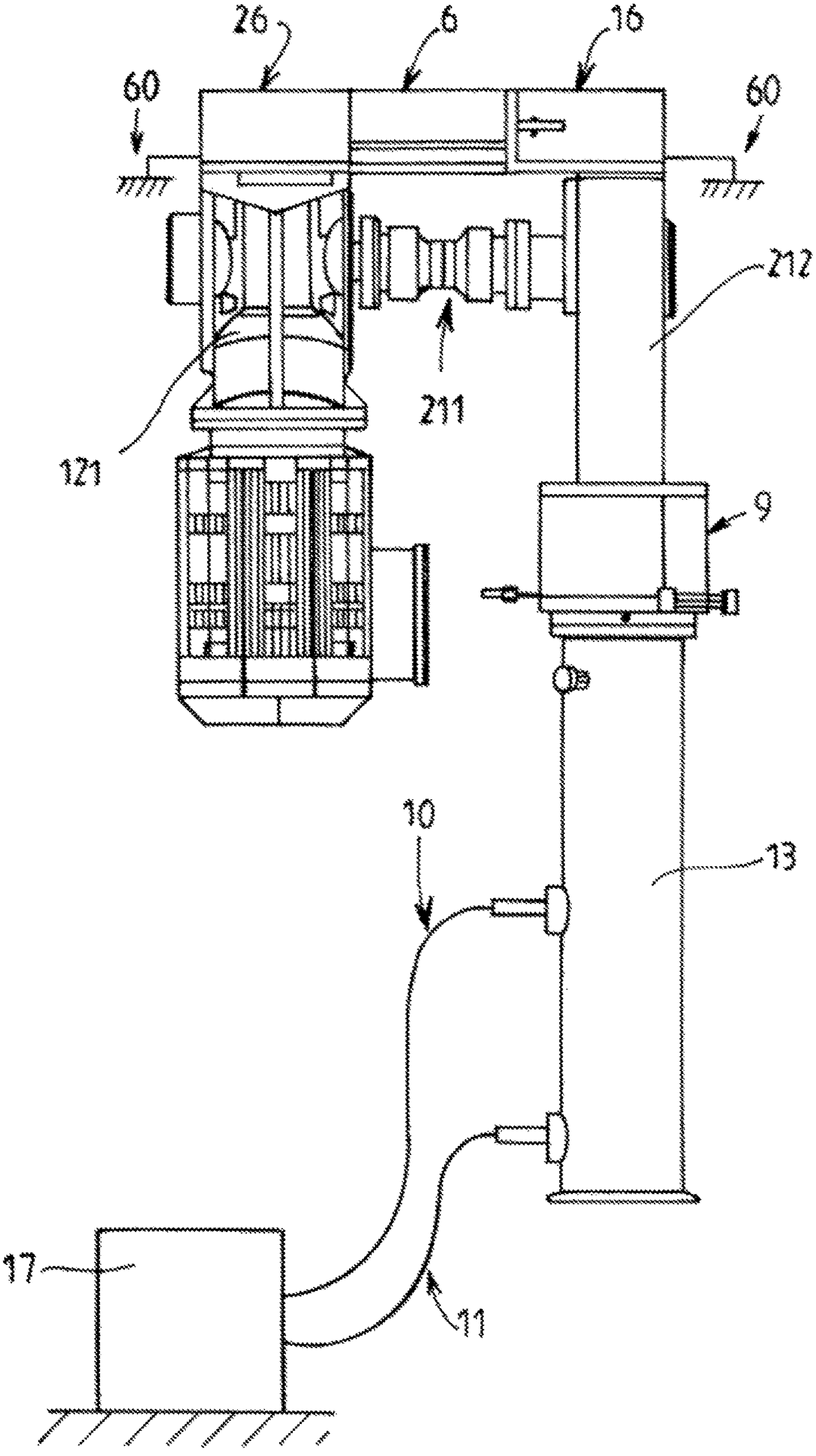

[FIG.3]
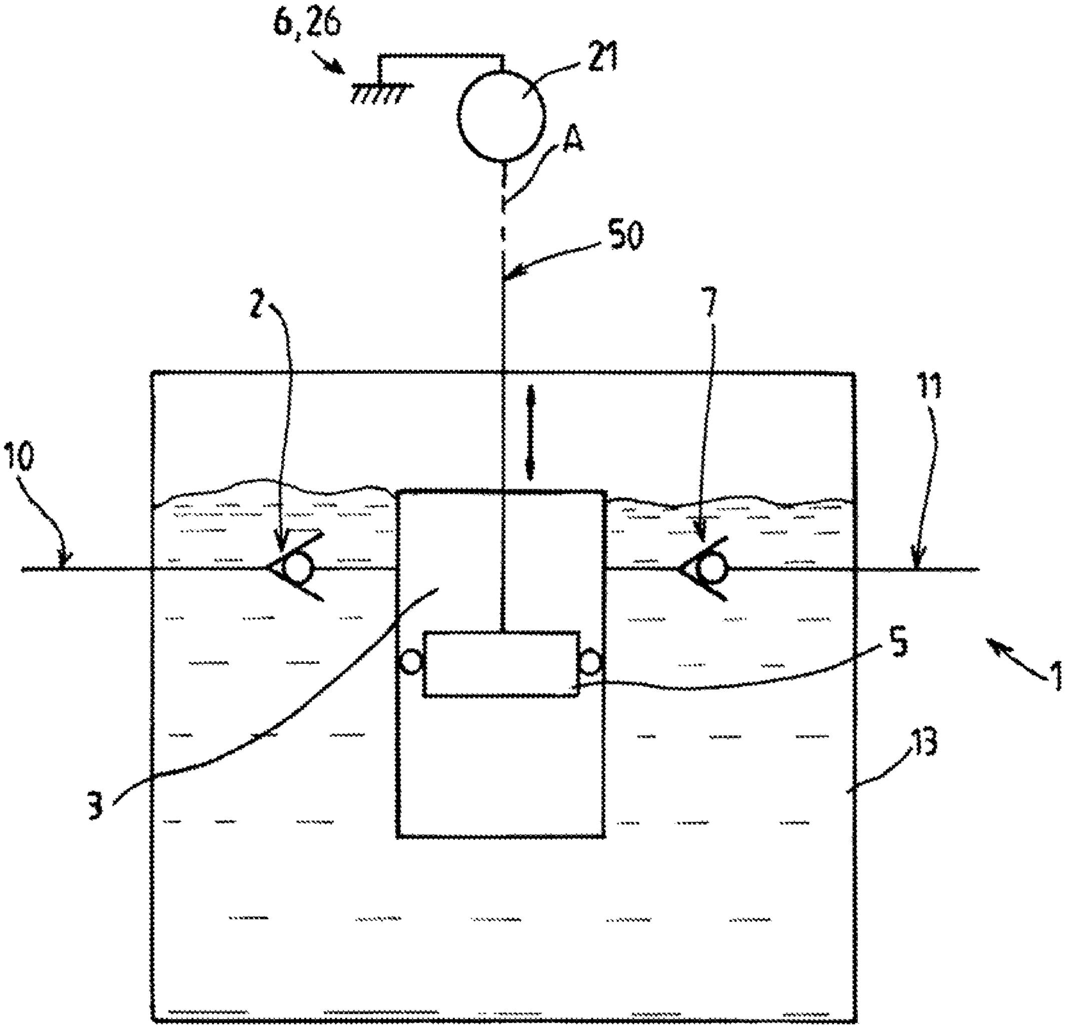

[FIG.4]
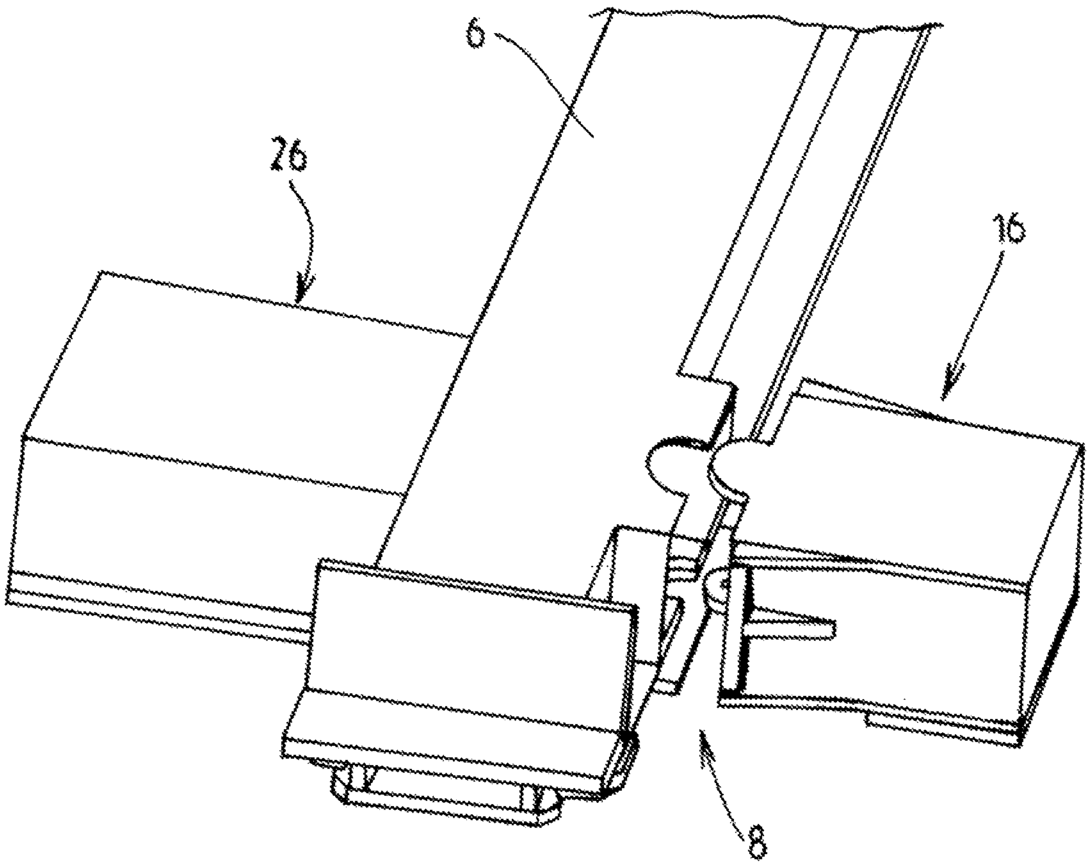

[FIG.5]
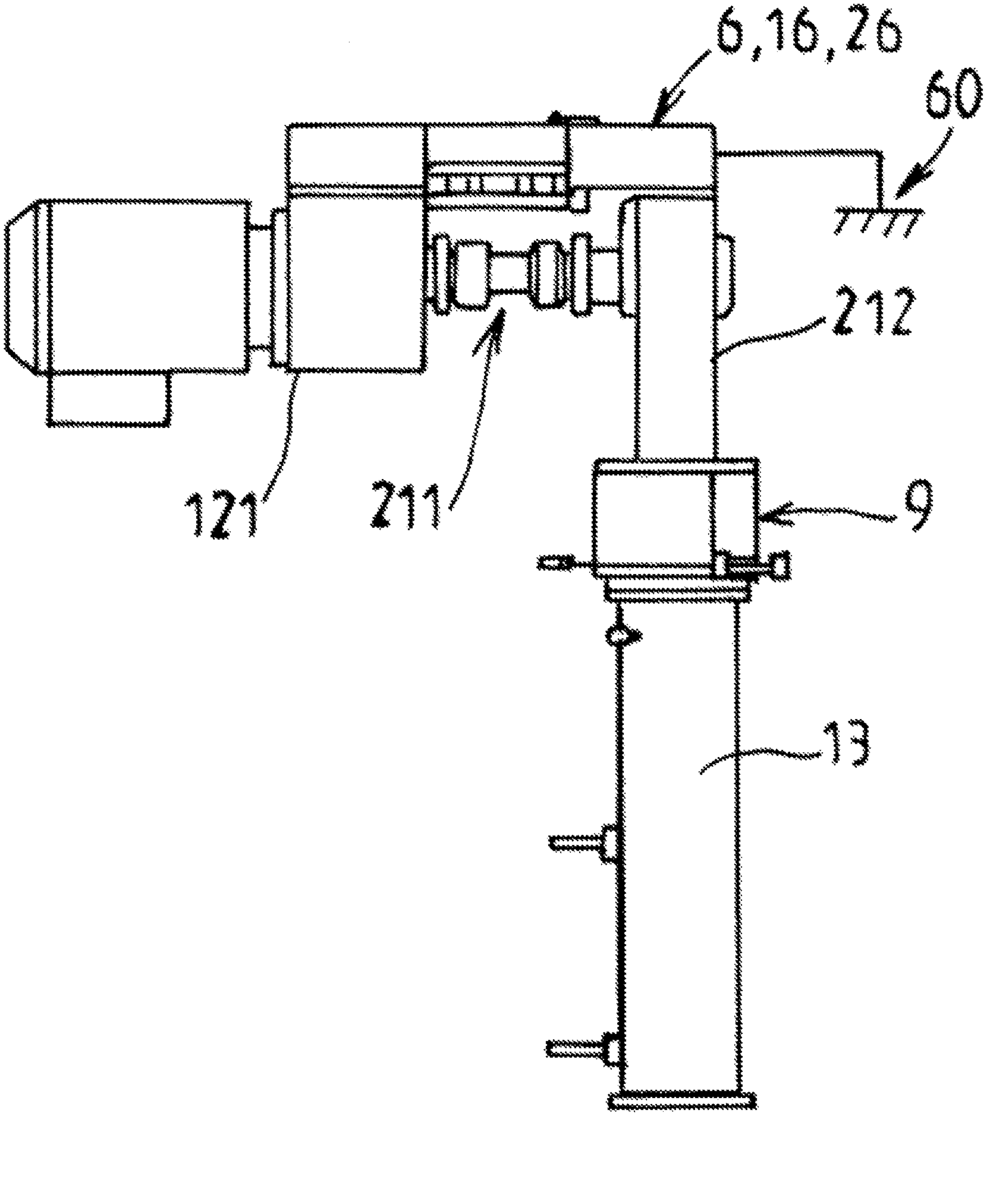

[FIG.6]
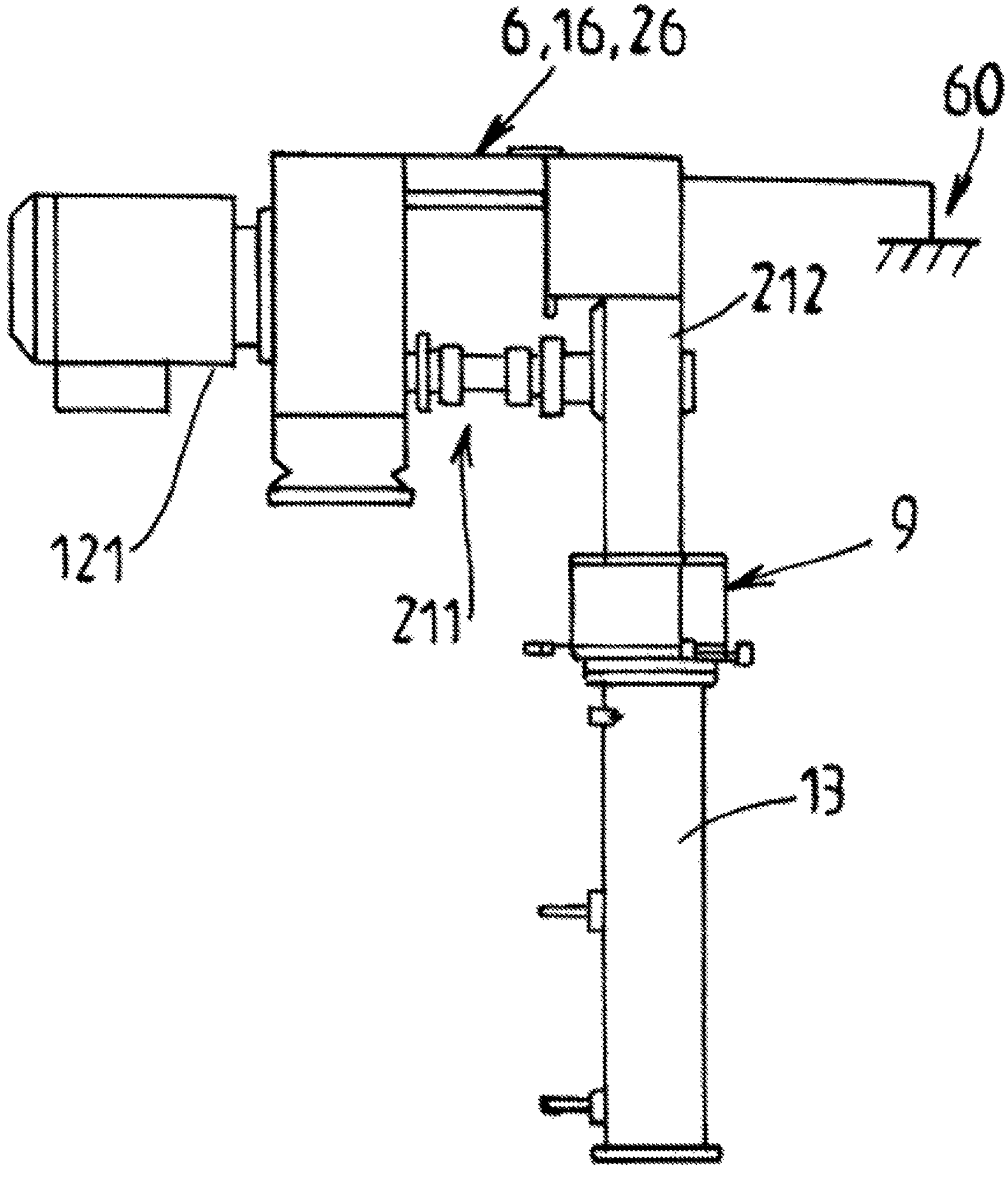

[FIG.7]
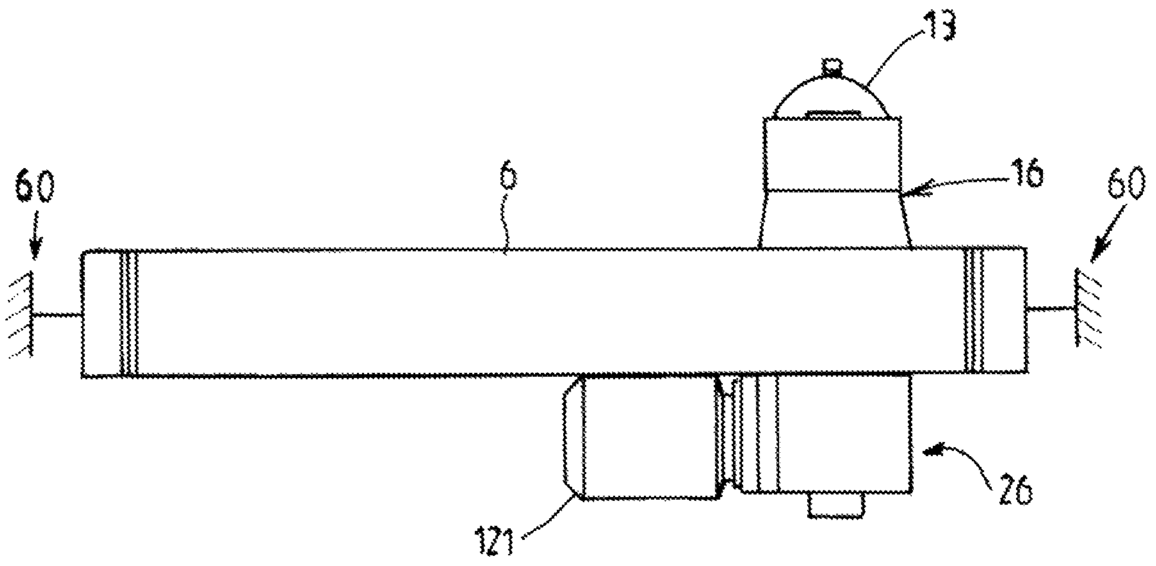

[FIG.8]
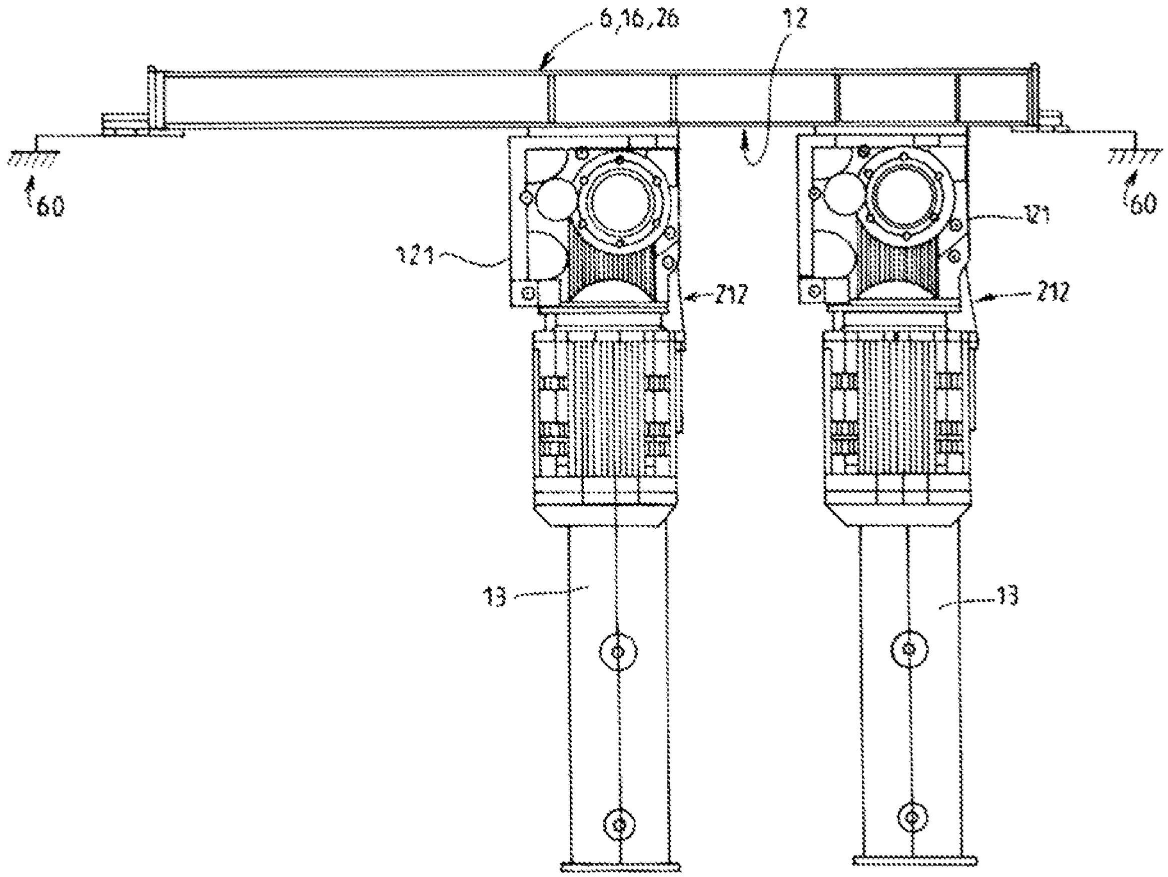

[FIG.9]
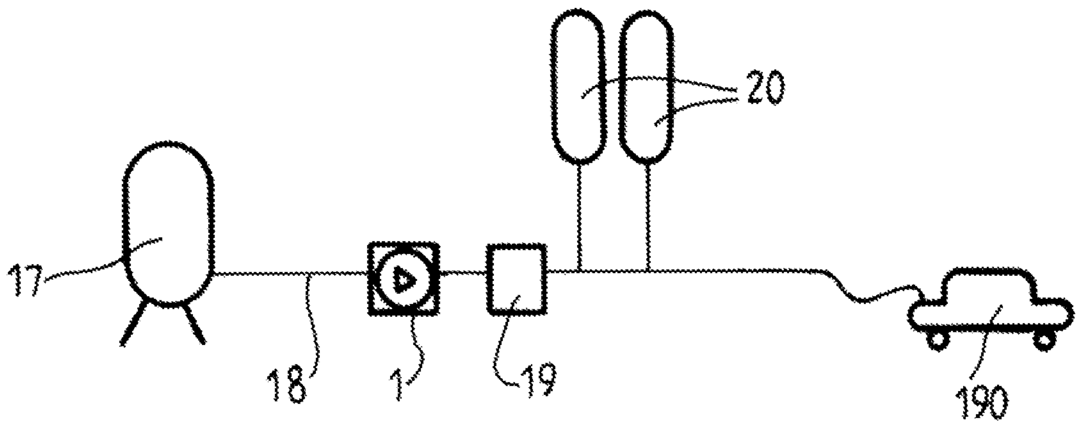
[FIG.10]
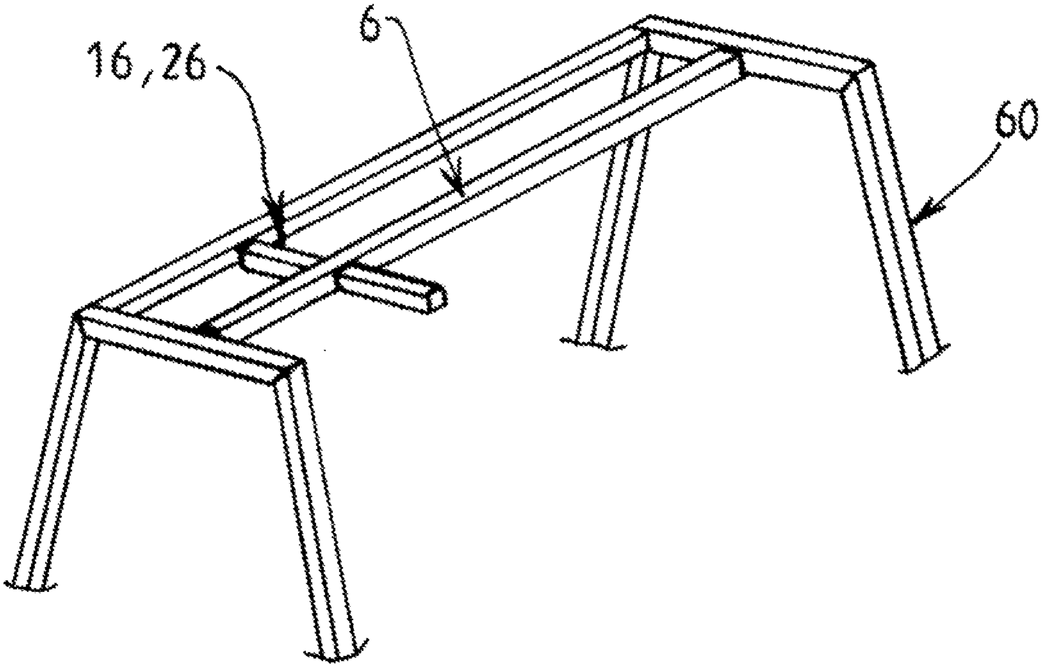

[FIG.11]
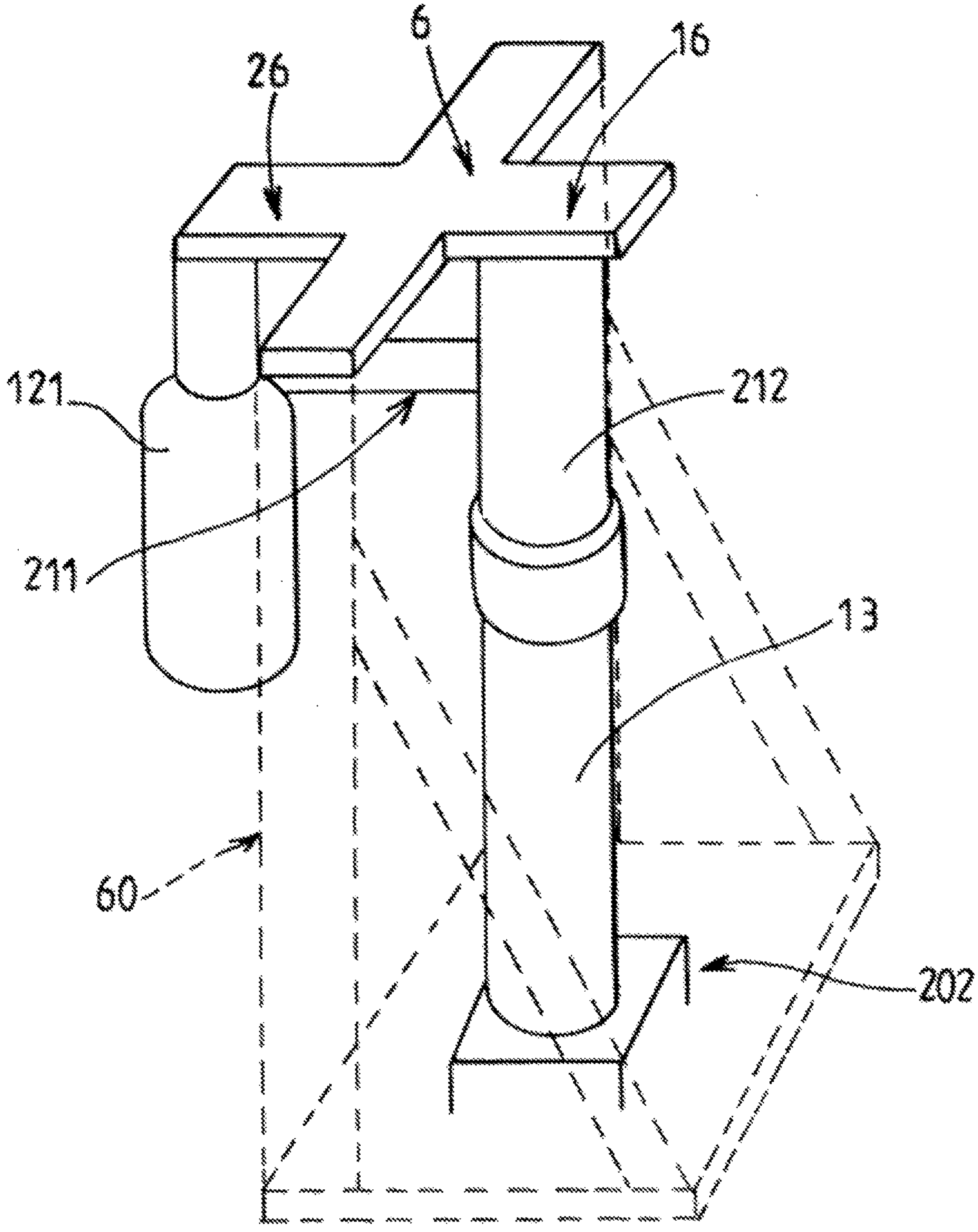

INSTALLATION FOR PUMPING CRYOGENIC FLUID AND FILLING STATION COMPRISING SUCH AN INSTALLATION

CROSS REFERENCE TO RELATED APPLICATIONS

This application is a 371 of International Application No. PCT/EP2022/062105, filed May 4, 2022, which claims priority to French Patent Application No. 2106231, filed Jun. 14, 2021, the entire contents of which are incorporated herein by reference.

BACKGROUND

The invention relates to an installation for pumping cryogenic fluid, and to a filling station comprising such an installation.

The invention relates more particularly to an installation for pumping cryogenic fluid comprising a fluidtight enclosure intended to contain a bath of cryogenic fluid, the enclosure housing a compression chamber communicating with the bath and a piston that is able to move in order to compress the fluid in the compression chamber, the piston being mounted at a first end of a rod, the apparatus comprising a drive mechanism driving a second end of the rod in a back and forth movement in a longitudinal direction of travel, the drive mechanism comprising a motor equipped with a rotary shaft and a mechanical conversion system converting the rotational movement of the rotary shaft into a translational movement, in the configuration of operation of the installation, the longitudinal direction of travel of the piston rod being vertical, the motor being fixed rigidly to an upper mounting structure.

A conventional solution for actuating a reciprocating piston pump uses a motor and a mechanical conversion system (connecting rod/crank and/or reduction gear and/or gearbox system) to convert the movement of the rotary shaft of the motor into a translational movement.

The majority of known cryogenic pumps operate with the piston axis horizontal. This can be done with a vacuum insulated cold end.

In hydrogen refuelling stations, the pump needs to be available for pumping 24-hours a day. It is therefore preferable for the cold end to be placed in a vacuum insulated bath (Dewar vessel) of cryogenic liquid (sump), to ensure that it remains cold. In such instances, it is more appropriate for the piston to be oriented vertically.

In such a case, certain adaptations are needed in order to optimally support the pump and the drive actuator (motor and associated mechanism). A Cardan system may be employed to transmit the torque from the rotation output of the gearbox of the motor to the crank of the mechanical unit that converts the rotational movement supplied by the motor into a reciprocating translational movement of the piston rod. This allows for optimal mounting without demanding overly close tolerances.

However, in this configuration, a torque is transferred through the axle of the Cardan to the mechanism that converts the rotational movement into a translational one. There is effectively no satisfactory counter-torque system. The casing of the mechanism needs to withstand this torque. The torque will thus be transferred through the entire pumping structure. This is unacceptable particularly as regards the mechanical strength of the tank containing the bath and the overall strength of the structure.

Even if these elements were dimensioned accordingly, there would still be risks with regard to the potential problems of vibration and fatigue.

With a hydraulic solution, it is relatively easy to position the pump vertically because the hydraulic ram is relatively small. The enormous supply unit may itself be relocated several meters away. However, the overall layout and effectiveness are not well suited to the application.

A solution involving a linear actuator with a roller screw is also easy to implement on account of its compactness. However, this solution is not well suited to high-pressure cryogenic applications because of its poor efficiency and reliability.

SUMMARY

An aim of the present invention is to overcome all or some of the prior-art drawbacks outlined above.

To this end, the installation according to the invention, in other respects in accordance with the generic definition thereof given in the above preamble, is essentially characterized in that the mechanical conversion system is also fixed rigidly to an upper mounting structure which comprises the mounting structure for the motor or a separate mounting structure rigidly connected to the mounting structure for the motor.

Furthermore, embodiments of the invention may comprise one or more of the following features:

the upper mounting structure for the motor comprises a first support beam(s) assembly, the upper mounting structure for the mechanical conversion system comprising a second support beam(s) assembly, the second beam(s) assembly being rigidly connected to the first support beam(s) assembly, the motor and the mechanical conversion system are rigidly fixed respectively to two distinct beam portions which are integral with or rigidly connected to a common beam extending in a longitudinal direction of the structure, the two beam portions are connected transversely to the common beam, two beam portions are located transversely one on each side of the common beam, at least one of the two beam portions is connected cantilever-fashion to the common beam, at least one of the two beam portions is connected to the common beam via a disconnectable mechanical connection equipped with a positioning system to allow the transverse and/or longitudinal position of said portion relative to the common beam to be adapted before this position is fixed, the rotary shaft is coupled to the mechanical conversion system via an axle comprising a connecting system such as a rigid connection or a Cardan joint, the motor is suspended from its upper mounting structure, the mechanical conversion system is suspended from its upper mounting structure, the fluidtight enclosure is suspended from the mechanical conversion system, the installation comprises several enclosures each housing a compression chamber, a mobile piston, the pistons being actuated by respective drive mechanisms each made up of a motor and of a mechanical conversion system, said motors and mechanical conversion systems being fixed to the one same upper mounting structure or to separate mounting structures that are rigidly connected to one another, the installation comprises a tank of liquefied gas, notably of hydrogen, said tank being fluidically connected by a set of pipes to the enclosure, these pipes being configured to supply the compression chamber with fluid that is to be compressed and to recover the fluid that has vaporized in the enclosure, the mechanical conversion system to convert the rotational movement of the rotary shaft into a translational movement of the piston rod is of the connecting rod/crank type, the mechanical conversion system is housed in a casing fixed to the upper mounting structure, the motor is housed in a casing fixed to the upper mounting structure, the installation is of the type having one compression stage, which is to say that the fluid is compressed just once, between an inlet system and a discharge system in the compression chamber, the installation is of the type having two compression stages, which is to say that the fluid is compressed twice, between an inlet system and a discharge system, the installation comprising two compression chambers, an inlet system communicating with a first compression chamber, a transfer system for communicating with the first and second compression chamber and configured to allow fluid compressed in the first compression chamber to be transferred to the second compression chamber, the mobile piston alternately compressing the fluid in the first and second compression chambers depending on the direction in which it is travelling, and a discharge system communicating with the second compression chamber, the compression of the fluid in the compression chamber is brought about by a pulling or a compressing of the rod.

The invention also relates to a station for filling tanks or pipes with pressurized gas and comprising a source of liquefied gas, notably a tank of liquefied hydrogen, a withdrawal circuit having a first end connected to the source and at least one second end intended to be connected to a tank to be filled, the withdrawal circuit comprising a pumping installation according to any one of the features above or below.

The invention may also relate to any alternative device or method comprising any combination of the features above or below within the scope of the claims.

BRIEF DESCRIPTION OF THE DRAWINGS

Further particular features and advantages will become apparent from reading the following description, which is given with reference to the figures, in which:

FIG. 1 shows a schematic and partial perspective view illustrating a first possible embodiment of a pumping installation according to the invention, FIG. 2 shows a partial and schematic face-on view illustrating the first embodiment of the installation and comprising a tank of cryogenic fluid, FIG. 3 shows a schematic and partial view in cross section illustrating a detail of the installation and in particular an example of the structure of a compression chamber, FIG. 4 shows a schematic and partial perspective view from above, illustrating a detail of the structure of the mounting structure of the installation in another possible embodiment, FIG. 5 shows a schematic and partial face-on view illustrating a second embodiment of the installation, FIG. 6 shows a schematic and partial face-on view illustrating a third embodiment of the installation, FIG. 7 shows a schematic and partial view from above illustrating a fourth embodiment of the installation, FIG. 8 shows a schematic and partial side view illustrating a fifth embodiment of the installation, FIG. 9 shows a schematic and partial view illustrating an example of a filling station using such a compression apparatus, FIG. 10 shows a schematic and partial perspective view illustrating an example of the structure of a support for the mounting structures of the installation.

FIG. 11 shows a schematic and partial perspective view of another example of an installation.

DETAILED DESCRIPTION OF PREFERRED EMBODIMENTS

The installation 1 depicted for pumping cryogenic fluid comprises a fluidtight enclosure 13 intended to contain a bath of cryogenic fluid. The enclosure 13 may be vacuum thermally insulated and houses a compression chamber 3 that communicates with the bath and a mobile piston 5 able to move in order to compress the fluid in the compression chamber 3, see FIG. 3.

The piston 5 is mounted at a first end of a piston rod 50. The apparatus 1 comprises a drive mechanism 21 for driving a second end of the rod 50 in a back and forth motion in a longitudinal direction A of travel.

The drive mechanism 21 comprises a motor 121 (with a gearbox or the like where appropriate) equipped with a rotary shaft 211 and a mechanical conversion system 212 that converts the rotational movement of the rotary shaft 211 into a translational movement of the rod 50. The mechanical conversion system 212 to convert the rotational movement of the rotary shaft 211 into a translational movement of the piston rod 50 may be of the connecting rod/crank type, and is housed inside a casing.

The rotary shaft 211 of the motor 121 is coupled to the mechanical conversion system 212 via an axle comprising a connecting system such as a rigid connection or a Cardan joint, for example.

A coupling involving a Cardan joint may allow greater tolerances on assembly.

The Cardan-joint coupling between the two entities also makes it possible for the “useful” torque to be transferred optimally with relative ease of maintenance.

These elements (motor 121 and mechanical conversion system 212) may be housed in respective casings.

The casing of the movement conversion system 212 may easily be removed in order to access the cold end positioned vertically beneath the mechanism (below a crankshaft notably in the case of a connecting-rod/crank mechanism).

As illustrated, when the installation 1 is in an operating configuration, the longitudinal direction A of travel of the piston rod 50 is vertical. The motor 121 is fixed rigidly to an upper mounting structure 6, 26.

The mechanical conversion system 212 is also fixed rigidly to an upper mounting structure which may be the same mounting structure 6, 26 for the motor 121 or a separate mounting structure connected rigidly to the mounting structure 6, 26 for the motor 121.

This means that the entirety of the drive mechanism 21 can be mounted (notably suspended) rigidly above the enclosure 13 via a structure able to support the motor 121 and the conversion mechanism 212 without transferring harmful torque into the structure.

In particular, the motor 121 (and its casing where applicable) may be suspended from its mounting structure 6, 26. In particular, the motor 121 and its casing may be fixed via its upper part to a lower face of the upper mounting structure 26 (for example using screws or some other means).

Likewise, the mechanical conversion system 212 (and its casing where applicable) may be suspended from its upper mounting structure 16, notably fixed by its upper part to the mounting structure (likewise for example using screws or some other means).

As a preference, each element 121, 212 may be removed from the mounting structure 16, 26 to which it is fixed and be so removed independently of the other element 121, 212. This is advantageous for maintenance.

This structure may support the vessel 13 suspended for greater flexibility. What this means to say is that an upper end of the vessel 13 may be suspended from a lower end of the mechanical conversion system 212 (notably the casing thereof) by a connecting member 9 such as one or more axles and/or a muff-coupling sleeve. The lower end of the vessel 13 may thus be situated above ground level without resting on a lower support.

Specifically, as described in greater detail hereinafter, the cryogenic pipes connecting this vessel 13 and a tank 17 of cryogenic liquid may be flexible pipes so as to absorb thermal contractions and tolerate minor misalignments.

In particular, the motor 121 and its casing may be rigidly connected to their upper mounting structure 26, 6. Likewise, the mechanical conversion system 212 and its casing may be rigidly connected to their upper mounting structure 16, 6.

The upper mounting structure for the motor 121 may comprise a first horizontal support beam(s) assembly 6, 26, these beams being connected to a load-bearing structure 60 which may comprise vertical legs resting on the ground.

Likewise, the upper mounting structure for the mechanical conversion system 212 may comprise a second support beam(s) assembly 6, 16.

As illustrated, the second beam(s) assembly is connected rigidly to the first support beam(s) assembly 6, 26. The two beam(s) assembly may be at least partially common. For example, the motor 121 and the mechanical conversion system 212 may be connected to two distinct portions 16, 26 of the one same beam (for example transverse beam) connected to a beam 6 (extending for example in a longitudinal direction of the structure).

The two beam portions 26, 16 may be connected transversely to the common beam 6.

As illustrated, the two beam portions 26, 16 may be situated transversely one on each side of the common beam 6 (notably at the same longitudinal position along the longitudinal beam 6 of the structure).

As illustrated, at least one of the two beam portions 26, 16 may be connected cantilever-fashion to the common beam 6. Thus, these two portions 16, 26 together with the beam 6 form a structure in the shape of a cross, notably a Latin cross.

These upper mounting structures 6, 16, 26 may be upper beams held at height via a set of legs or a statically indeterminate structure. See for example the schematic depiction in FIG. 10.

As illustrated, the load-bearing structure 60 bearing the upper beams (mounting structures) 6, 16, 26 may comprise an upper structure supported by legs and forming a support for each of the beam portions 16, 26 on which the motor and the conversion mechanism are respectively suspended (on either side of the common beam 6). For example, the terminal ends of these beam portions 16, 26 are connected to upper elements (horizontal axles or members for example) supported by legs and forming the load-bearing structure 60. In the example illustrated, the two ends of the common beam 6 and the end of one of the two transverse beam portions bear against the structure 60 (the other end of the beam portion may project cantilever-fashion). Of course, it is possible to conceive of a configuration wherein the four ends of the mounting structure 6, 16, 26 (which is to say the four ends of the "cross" formed by the upper mounting structure) are connected to the upper part of a load-bearing structure 60 (for example four horizontal members that form an upper frame).

As schematically indicated in the embodiment variant of FIG. 4, at least one of the two beam portions (notably the one 16 to which the mechanical conversion system 212 is attached) may be connected to the common beam 6 via a mechanical connection 8 that is disconnectable and preferably equipped with a positioning system to allow the transverse and/or longitudinal position of said portion 16 relative to the common beam 6 to be adapted before this position is fixed. For example, a self-centering semicircular flexible fixing system may be envisioned. This flexible fixing system is of the type that allows a certain degree of movement for optimal assembly, for example a semicircular groove (self-centering) system. Other fixing devices may be envisioned.

The movement conversion system 212 and notably the casing thereof may thus be over a small part of a beam 16 which may be independently fitted on and removed from the main beam 6.

In the example of FIG. 2, the installation 1 comprises a tank 17 of liquefied gas, notably of hydrogen. The tank 17 is fluidically connected by a set of pipes 10, 11 to the enclosure 13, and these pipes are configured to supply the compression chamber 3 with fluid that is to be compressed and to recover the fluid that has vaporized in the enclosure 13.

This tank 17 may rest on the ground. As mentioned previously, the pipes 10, 11 may comprise flexible portions.

In the aforementioned examples, the installation 1 comprises a single motor 121, a single mechanical conversion system 212 and a single vessel 13. Of course, as schematically indicated in FIG. 8, the installation 1 could comprise several enclosures 13 each housing a compression chamber, a mobile piston, the pistons being actuated by respective drive mechanisms 21 each made up of a motor 121 and of a mechanical conversion system 212, said motors 21 and mechanical conversion systems 212 being able to be fixed to the one same upper mounting structure 6, 16, 26 or to separate mounting structures rigidly connected to one another.

A separation space 12 may be provided on the longitudinal beam 6 of the structure between two adjacent units in order to facilitate maintenance. The assembly made up of the mechanical conversion system 212, its casing, and the corresponding support beam 16 of one of the two units may be fixed temporarily at this portion during maintenance.

The structure of the installation offers a number of advantages.

Aside from transmitting motion without unwanted torque (no load cycling throughout the structure; less vibration expected), the structure is particularly well suited to ease of maintenance (for example by the removal of a suspended element, notably a casing, in order to access the mechanism (s)).

The drive mechanism (motor+possibly reduction gear or gearbox) does not need to be removed during maintenance of the cold side of the cryogenic pumping part. The frequency of maintenance of the motor part 121 is actually generally lower than for the cold drive part. The proposed structure allows the cold part to be accessed without removing the motor part 121 (visual inspection, cleaning, replacement of seals, lubrication, etc.).

In the proposed configuration, because of the suspended structure described hereinabove, the motor part 121 does not need to support the weight of the transmission part 212 and the cold part.

The installation 1 is compact and positioned low to the ground. This is well suited to its integration into a filling station.

The motor 121 and the associated reduction gear may be standard elements, notably with an explosion-proof structure or augmented safety.

The motor 121 and the conversion system 212 may be positioned in various relative configurations, notably horizontally, vertically, with the shaft 211 rotating in or perpendicular to this axis depending on the model of known reduction-gear system 212 (helical gear, helical bevel gear, worm gear, helical parallel shaft, right-angle reducer).

In the example of FIG. 1 and of FIG. 2, the motor 121 is vertical and perpendicular to the axle 211 which is connected to the mechanical movement conversion system 212.

In the configuration of FIG. 5, the motor 121 and the output axle 211 are horizontal and oriented transversely to the longitudinal beam 6 of the structure. This configuration makes it possible to save space beneath the upper mounting structure 6, 16, 26.

In the configuration of FIG. 6, the axle 211 connected to the mechanical conversion system 212 is situated relatively lower down with respect to the motor 121 (via the structure of a reduction gearbox or gearbox at the output of the motor 121). This configuration makes it possible to save space beneath the drive unit and makes it possible to reduce the height of the connection 9 between the vessel 13 and on the vertical support.

In the configuration of FIG. 7, the motor 121 is arranged horizontally and parallel to the longitudinal beam 6 of the structure. This reduces the amount of bulk beneath the drive system and transversely.

The assembly comprising the motor 121 and its reducer, if any, illustrated and from which the rotary axle 211 projects may, where applicable, advantageously be replaced by a torque motor (which therefore has no reduction gearbox or gearbox). In such an instance, there is no problem with oil due to lubrication. In addition, in such an instance, the assembly is more compact and lighter in weight. In addition, such a motor assembly offers greater flexibility in the setting of the speed (speed, and notably rotational-speed, profile).

FIG. 3 schematically illustrates an example of a compression chamber (single compression stage) with an intake system 2 communicating with the compression chamber 3 and configured to allow fluid that is to be compressed to enter the compression chamber 3, a piston 5 able to move in order to compress the fluid in the compression chamber 3, and a discharge system 7 communicating with the compression chamber 3 and configured to allow the compressed fluid to exit. The compression of the fluid in the compression chamber may be brought about by a pulling or a compressing of the rod 50.

Of course, the invention also applies to pumps having two compression stages (for example, two compression chambers and two compression stages each for a respective one of the two directions of translational movement of the piston).

FIG. 9 depicts an example of a station for filling tanks or pipes with pressurized gas and comprising a source 17 of liquefied gas, notably liquefied hydrogen, a withdrawal circuit 18 having a first end connected to the source and at least one second end intended to be connected to a tank 190 to be filled. The withdrawal circuit 18 comprising a compression apparatus 1 conforms to the installation in accordance with any one of the above features.

Although the enclosure 13 is suspended from the mechanical conversion system 212, which is itself suspended from its upper mounting structure, as schematically indicated in FIG. 1, it is possible to envision providing one or more legs 20 connecting the enclosure 13 to the ground via a flexible and/or adjustable connection 201. This may be during the maintenance operation and/or in a situation of normal operation in order, for example, to support the enclosure 13 better and for example absorb any vibrations there might be.

Alternatively or in addition, the enclosure 13 may rest (for example via its lower end or bottom) on the upper surface of a support 202, for example one with legs (see FIG. 11). This makes it possible to absorb some of the load transmitted to the vessel 13.

As illustrated in FIG. 11, the upper mounting structure or structures to which the motor 21 and the mechanical conversion system 212 are attached may be supported by a statically indeterminate structure 60 comprising for example beams that form legs.

This statically indeterminate structure forms for example a frame and may be equipped with a base placed on the ground and on which the support 202 or legs 20 for holding the vessel 13 may rest.

Such a structure 60 may be provided for each pumping assembly comprising a vessel 13, a motor and a mechanism 121 for driving the piston.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An installation for pumping cryogenic fluid comprising a fluid tight enclosure configured to contain a bath of cryogenic fluid, the enclosure housing a compression chamber communicating with the bath and a piston configured to move in order to compress the fluid in the compression chamber, the piston being mounted at a first end of a rod, the installation comprising:

a drive mechanism driving a second end of the rod in a back and forth movement in a longitudinal direction of travel, the drive mechanism comprising a motor equipped with a rotary shaft and a mechanical conversion system converting the rotational movement of the rotary shaft into the back and forth movement, during operation of the installation, the longitudinal direction of travel of the piston rod being vertical, the motor being fixed rigidly to a motor upper mounting structure, wherein the mechanical conversion system is also fixed rigidly to a mechanical conversion system upper mounting structure which comprises the motor upper mounting structure or a separate mounting structure rigidly connected to the motor upper mounting structure, wherein the motor upper mounting structure comprises a first support beam assembly, the mechanical conversion system upper mounting structure comprising a second support beam assembly, the second support beam assembly being rigidly connected to the first support beam assembly, wherein the motor is rigidly fixed to the first support beam assembly and the mechanical conversion system is rigidly fixed to the second support beam assembly which are integral with or rigidly connected to a common beam extending in a second direction transverse to the longitudinal direction of travel.

2. The installation as claimed in claim 1, wherein the first support beam assembly and the second support beam assembly are connected transversely to the common beam.

3. The installation as claimed in claim 2, wherein the first support beam assembly and the second support beam assembly are located transversely one on each side of the common beam.

4. The installation as claimed in claim 1, wherein at least one of the first support beam assembly and the second support beam assembly are connected cantilever-fashion to the common beam.

5. The installation as claimed in claim 1, wherein the rotary shaft is coupled to the mechanical conversion system via an axle comprising a connecting system selected from the group consisting of a rigid connection and a Cardan joint.

6. The installation as claimed in claim 1, wherein the motor is suspended from the motor upper mounting structure.

7. The installation as claimed in claim 1, wherein the mechanical conversion system is suspended from the mechanical conversion system upper mounting structure.

8. The installation as claimed in claim 1, wherein the fluid tight enclosure is suspended from the mechanical conversion system.

9. The installation as claimed in claim 1, further comprising several enclosures each housing a compression chamber and a mobile piston, the mobile pistons being actuated by respective drive mechanisms each made up of a respective motor and of a respective mechanical conversion system, said respective motors and respective mechanical conversion systems being fixed to a one same upper mounting structure or to separate upper mounting structures.

10. The installation as claimed in claim 1, wherein the enclosure rests on a lower base selected from the group consisting of the ground via a support and/or a set of leg(s).

11. The installation as claimed in claim 1, wherein the motor upper mounting structure and/or the mechanical conversion system upper mounting structure are fixed and supported by a statically indeterminate structure comprising beams forming legs.

12. The installation as claimed in claim 1, further comprising a tank of liquefied gas, said tank being fluidically connected by a set of pipes to the enclosure, these pipes being configured to supply the compression chamber with fluid that is to be compressed and to recover a fluid that has vaporized in the enclosure.

13. A station for filling tanks or pipes with pressurized gas and comprising a source of liquefied gas, a withdrawal circuit having a first end connected to the source of liquefied gas and at least one second end intended to be connected to a tank to be filled, the withdrawal circuit comprising a pumping installation as claimed in claim 1.

* * * * *